June 28, 1932. C. H. WILLAUER 1,864,569
FEEDER
Filed Oct. 15, 1930    2 Sheets-Sheet 2
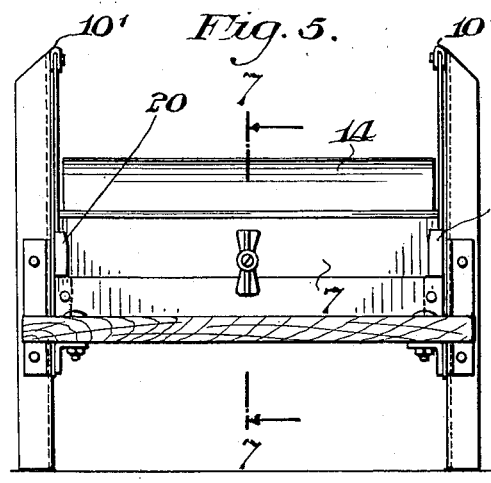
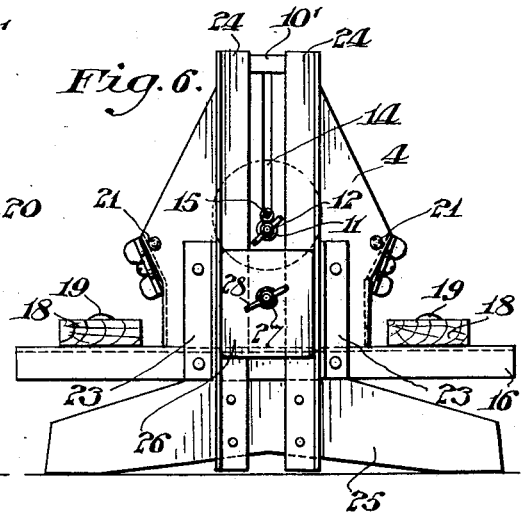
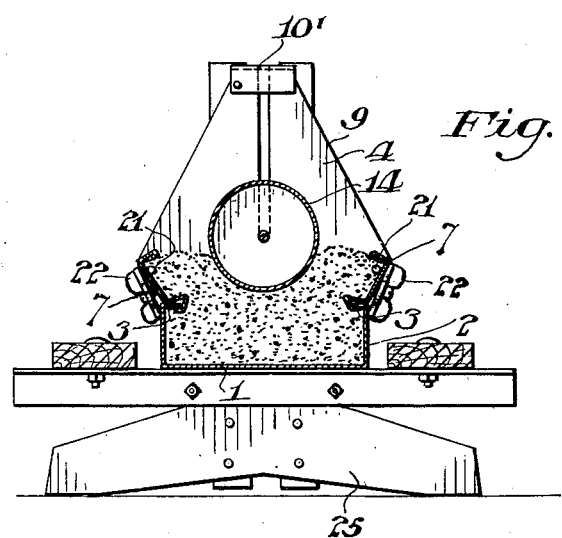
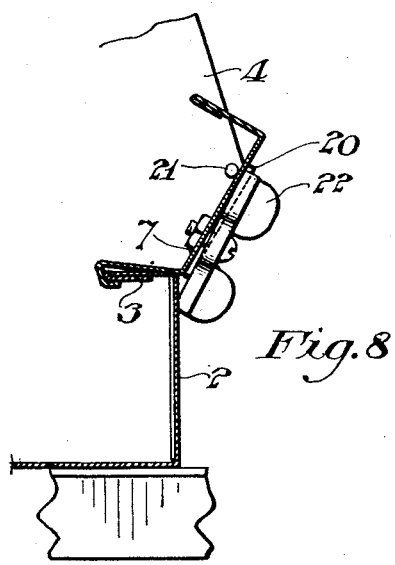
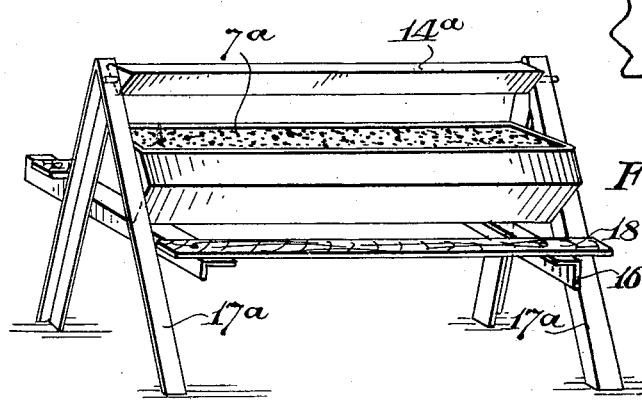
Inventor:
Charles H. Willauer,
By
Attorney.

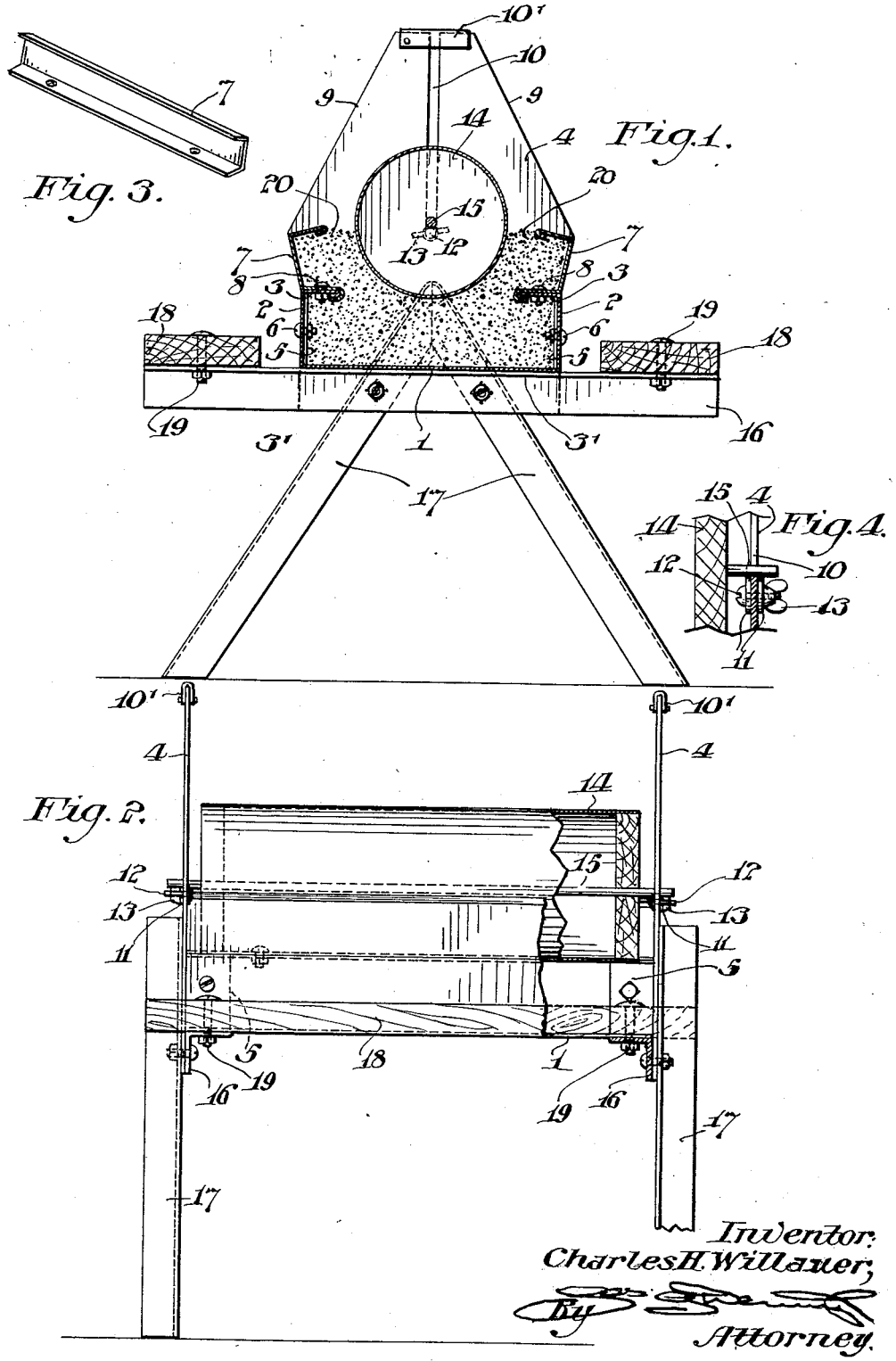

Patented June 28, 1932

1,864,569

UNITED STATES PATENT OFFICE

CHARLES H. WILLAUER, OF RICHLAND TOWNSHIP, BUCKS COUNTY, PENNSYLVANIA

FEEDER

Application filed October 15, 1930. Serial No. 488,729.

My invention is an improved apparatus for supplying nourishment to animals, and particularly to poultry, and the leading object of my invention is the provision of apparatus affording an open view and easy access to the feed at all times while preventing defilement of the feed by the fowls, which are deterred from roosting over the food chamber by the provision of an unstable perch partially obstructing the mouth of the chamber. Further objects of my invention are the avoidance of waste of feed and the provision of a feeder which can be readily filled, easily cleaned and need not restrict the area available for scratching by the fowls. My improvements further provide a feeder which is readily adjustable to accommodate fowls of different sizes or ages and which is simple and economical in construction and mode of operation.

In accordance with my invention, there is provided a trough forming a feed container having walls of adjustable height and a mouth partially closed by a movable guard forming an unstable perch. The unstable perch is also adjustable vertically relatively to the side walls of the trough and the movement thereof under the weight of a fowl attempting to roost thereon will eject the fowl from such movable perch, which is so positioned relatively to the side walls of the trough as to deter fowls from roosting upon such walls. The trough preferably is vertically adjustable on its supports, and has connected therewith one or more fixed perches for the accommodation of fowls too small or lazy to reach the food from the ground. The edges of the trough are preferably provided with inturned flanges which not only prevent the ejection of feed but facilitate the attachment of supplementary wall sections for increasing the depth of the feed chamber.

The characteristic features and advantages of my improvements will further appear from the following description and the accompanying drawings of illustrative embodiments of my invention.

In the drawings, Fig. 1 is a transverse sectional view of a feeder embodying my invention; Fig. 2 is a part sectional side elevation thereof; Fig. 3 is a detailed fragmentary view on a reduced scale of one of the trough wall sections; Fig. 4 is an enlarged detailed view of the mounting for the rotating guard; Fig. 5 is a side elevation of a modified form of the invention; Fig. 6 is an end elevation of the device shown in Fig. 5; Fig. 7 is a transverse sectional view on the line 7—7 of Fig. 5; Fig. 8 is an enlarged detailed view of the corner construction for securing the supplementary trough wall sections; and Fig. 9 is a perspective view of a further modification.

As illustrated in Figs. 1 to 8 inclusive of the drawings, a trough or container is preferably formed by bending a sheet metal blank to form a bottom 1, side walls 2 and inturned flanges 3 provided with edge finishing lips 3'. End members 4 have inturned edge flanges 5 secured by bolts 6 to the sides 2. The depth of the feed chamber formed by the trough may be increased by the addition of channeled wall sections 7 which are preferably so bent as to hook over the edges 3' of the flanges 3, and the upper edges of the wall sections 7 are inturned to provide a finished non-cutting edge.

The portions of the end members 4 projecting above the wall sections 7 preferably have converging edges 9 and contain slots 10 which are closed by yoke like clips 10' pivoted on the end members 4 to prevent a fowl from catching a leg in such slots.

Washers 11 are clamped against opposite sides of the ends 4 by bolts 12 and thumb nuts 13 to form bearings which may be adjusted to and clamped at any desired elevation in the slots 10.

A hollow cylindrical barrel or drum 14 is mounted on a shaft 15 projecting through the slot 10 and supported by the mountings formed by the parts 11, 12 and 13. As will be observed, the drum 14 may both freely rotate and move vertically and forms a light adjustable guard or partial closure for the mouth of the trough.

As illustrated in Figs. 1 to 4 inclusive, the supplementary wall sections 7 are secured to the inturned flanges 3 by bolts 8, and the trough is supported on a frame comprising the angle iron stringers 16 bolted to the converging angle iron legs 17 and having perches 18 fixed thereto by bolts and nuts 19.

As illustrated in Figs. 5 to 8 inclusive, the end sections 4 have ears 20 bent therefrom and studs 21 are fixed to the end members 4 adjacent to the ears 20 so as to permit the vertical edges of the wall sections 7 to be passed between them and hooked over the flanges 3. Winged buttons 22 are pivotally connected with the wall sections 7 and when turned to engage the side walls 2 such buttons coact with the lips 20, studs 21 and hooked engagement with the flange 3 to firmly fix the wall sections 7 in position.

The end sections 4 and stringers 16 also have fixed thereto the angle irons 23 forming slideways for the spaced angle iron slides 24 fixed to the bases 25. A clamping plate 26 is positioned between the slideways 23 and may be drawn up toward the end members 4 by the bolt 27 and wing nut 28. By loosening the nuts 28 the trough and its supporting stringers may be lifted to any desired elevation on the legs 24 and then clamped in such position by tightening the nut 28 so as to cause the legs 24 to be tightly clamped between the ends 4 and the plates 26.

It will be understood that when small fowls are to be fed the stringers 16 may be disengaged from the base 17 and rest on the ground in the form of the invention shown in Figs. 1 to 4 inclusive or the trough and stringers 16 may be adjusted to their lowest position as shown in Figs. 4 to 8 inclusive. The supplementary wall sections 7 may also be removed and the movable guard perch 14 adjusted to its lowest position. For larger fowls, the trough is elevated by the attachment of suitable legs 17 or by adjustment of the sliding support shown in Figs. 4 to 8, the wall sections 7 are attached and the mountings for the drum 14 are adjusted to position such drum as to afford the desired ingress to and egress from the trough.

As shown in Fig. 9, a modified form of trough having upper side sections 7a converging toward one another is mounted upon stringers 16 supported by converging legs 17a having their apexes above the top of the trough. A revoluble hollow guard perch 14a is journalled in the apexes of the legs, the guard perch being shown in this figure as of triangular cross section, although it will be understood that other forms of guard perches forming an insecure footing for the fowls may be used in this form as well as in the previously described forms of my invention.

Having described my invention I claim:

1. Apparatus of the character described comprising means forming a feed chamber having a mouth and a hollow drum journalled adjacent to and partially obstructing said mouth.

2. Apparatus of the character described comprising means forming a feed chamber having a mouth and a revoluble drum partially obstructing said mouth.

3. Apparatus of the character described comprising a trough forming a feed chamber and a cylinder of sheet material revoluble in and partly closing said chamber and forming an unstable perch.

In testimony whereof I have hereunto set my hand this 30th day of September, 1930.

CHARLES H. WILLAUER.